(12) United States Patent
Bell et al.

(10) Patent No.: US 11,464,226 B2
(45) Date of Patent: Oct. 11, 2022

(54) AGROCHEMICAL CONCENTRATES CONTAINING ALKYL POLYGLUCOSIDE AND NON-IONIC SURFACTANT

(71) Applicant: SYNGENTA PARTICIPATIONS AG, Basel (CH)

(72) Inventors: Gordon Alastair Bell, Bracknell (GB); Renaud Louis Benoit Perrin, Bracknell (GB); Niall Rae Thomson, Bracknell (GB)

(73) Assignee: SYNGENTA PARTICIPATIONS AG, Basel (CH)

( * ) Notice: Subject to any disclaimer, the term of this patent is extended or adjusted under 35 U.S.C. 154(b) by 411 days.

(21) Appl. No.: 16/347,561

(22) PCT Filed: Oct. 12, 2017

(86) PCT No.: PCT/EP2017/076117
§ 371 (c)(1),
(2) Date: May 3, 2019

(87) PCT Pub. No.: WO2018/082895
PCT Pub. Date: May 11, 2018

(65) Prior Publication Data
US 2019/0254275 A1    Aug. 22, 2019

(30) Foreign Application Priority Data

Nov. 2, 2016  (GB) ..................... 1618479

(51) Int. Cl.
| | |
|---|---|
| *A01N 25/20* | (2006.01) |
| *A01N 25/30* | (2006.01) |
| *A01N 25/04* | (2006.01) |
| *A01N 41/06* | (2006.01) |
| *A01N 41/10* | (2006.01) |
| *A01N 43/56* | (2006.01) |
| *A01N 43/653* | (2006.01) |
| *A01N 43/90* | (2006.01) |
| *A01N 47/36* | (2006.01) |

(52) U.S. Cl.
CPC ............ *A01N 25/30* (2013.01); *A01N 25/04* (2013.01); *A01N 41/06* (2013.01); *A01N 41/10* (2013.01); *A01N 43/56* (2013.01); *A01N 43/653* (2013.01); *A01N 43/90* (2013.01); *A01N 47/36* (2013.01)

(58) Field of Classification Search
CPC ........ A01N 25/30; A01N 47/36; A01N 41/10; A01N 41/06; A01N 25/04; A01N 43/56; A01N 41/04; A01N 43/653; A01N 43/90
See application file for complete search history.

(56) References Cited

U.S. PATENT DOCUMENTS

| | | | |
|---|---|---|---|
| 6,849,577 B1 | 2/2005 | Bean et al. | |
| 2011/0082037 A1* | 4/2011 | Merlet ................... | A01N 57/20 504/128 |
| 2011/0130289 A1 | 6/2011 | Stefl et al. | |
| 2012/0283098 A1 | 11/2012 | Zhang et al. | |
| 2013/0210627 A1 | 8/2013 | Miln et al. | |
| 2013/0231302 A1* | 9/2013 | Raad ...................... | A01N 31/02 514/54 |
| 2014/0121105 A1 | 5/2014 | Herzog et al. | |
| 2016/0157479 A1 | 6/2016 | Elliott et al. | |

FOREIGN PATENT DOCUMENTS

| | | |
|---|---|---|
| JP | 20022524776 A | 12/1899 |
| JP | 2014231484 A1 | 12/2014 |
| RU | 2479205 C2 | 4/2013 |
| WO | 9948359 A1 | 9/1999 |
| WO | 0015037 A1 | 3/2000 |
| WO | 2009075588 A1 | 6/2009 |
| WO | 2016118699 A1 | 7/2016 |

OTHER PUBLICATIONS

Croda (Speciality ingredients for personal care 2nd Edition, Nov. 2005) (Year: 2005).*
SDS, Dehypon LT 104, BASF (Year: 2019).*

* cited by examiner

*Primary Examiner* — Johann R Richter
*Assistant Examiner* — Danielle Sullivan
(74) *Attorney, Agent, or Firm* — BakerHostetler; Toni-Junell Herbert

(57) ABSTRACT

This invention relates to a mixture of an alkyl polyglucoside with a (biological performance improving) adjuvant which is a non-ionic surfactant, the mixture improving the biological performance of an agrochemical. The biological performance effect of the alkyl polyglucoside is poorer than the partner adjuvant but the biological performance effect of the mixture is as good as that delivered by a much larger amount of that better, partner adjuvant alone.

10 Claims, No Drawings

AGROCHEMICAL CONCENTRATES CONTAINING ALKYL POLYGLUCOSIDE AND NON-IONIC SURFACTANT

CROSS-REFERENCE TO RELATED APPLICATIONS

This application is a 371 National Stage application of International Application No. PCT/EP2017/076117, filed Oct. 12, 2017, which claims priority to GB Application No. 1618479.8 filed Nov. 2, 2016, the entire contents of which applications are hereby incorporated by reference.

This invention relates to a mixture of an alkyl polyglucoside with a (biological performance improving) adjuvant which is a non-ionic surfactant, the mixture improving the biological performance of an agrochemical. The biological performance effect of the alkyl polyglucoside is poorer than the partner adjuvant but the biological performance effect of the mixture is as good as that delivered by a much larger amount of that better, partner adjuvant alone.

Alkyl polyglucosides (APGs) are used in agrochemical formulations for various reasons, such as surfactants for wetting, and they are known to have adjuvant effects. These adjuvant effects allow more biological activity to be gained from the application of a agrochemical to a plant or crop. The fundamental performance of APGs as bioperformance enhancing adjuvants is however rather poor. Examples in the literature indicate that there are many better adjuvants which could be used instead. The literature does not provide any direction about mixtures of APG adjuvants with other better adjuvants. Examples of APGs with other surfactants are known, however there is nothing to indicate that these mixtures are better or worse than any other mixture of adjuvants.

The APGs used in the present invention are compounds of formula (I):

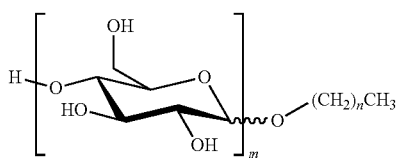

where n is a mean value and is from 7 to 11; and m is a mean value and is from 1 to 3. [n+1 is the mean number of carbon atoms in the hydrophobic tail of the APG; and m is the mean number of sugar rings on the hydrophilic head group of the APG.]

There are examples in the literature which show that the rate of added adjuvant is important in determining the level of efficacy improvement of an agrochemical. It might be expected that a mixture with a low quantity of a good adjuvant and a large quantity of a poor adjuvant would not be as efficacious as a formulation with a large quantity of a good adjuvant alone. Surprisingly we have found that this is not the case. Where we have replaced some of a good adjuvant in a composition with an equivalent weight of an APG we have found that the biological performance achieved with the mixture is equal to that achieved with the composition with the higher weight of the good adjuvant.

There are several advantages which can be gained by using a mixture of an APG with another adjuvant. The inclusion of the APG can reduce the overall cost of the formulation, it can alter its aqueous dilution properties and it can alter the toxicology of the formulation.

The present invention relies on the appropriate 'HLB' of the good adjuvant. The hydrophilic-lipophilic balance (HLB) of a surfactant is a measure of the degree to which it is hydrophilic or lipophilic, determined by calculating values for the different regions of the molecule, as described by Griffin in 1949 and 1954. Although other methods have been suggested, notably in 1957 by Davies, the present invention relies upon the Griffin HLB method, in which:

$$HLB = 20 \times M_h/M$$

where $M_h$ is the molecular mass of the hydrophilic portion of the molecule, and M is the molecular mass of the whole molecule, giving a result on a scale of 0 to 20. Whilst the Griffin HLB can be calculated empirically for simple molecules, for more complicated structures there are suitable experimental procedures (for example, see Chun and Martin, Journal of Pharmaceutical Sciences, Vol. 50, No. 9, September 1961, pp 732-736).

An HLB value of 0 corresponds to a completely lipophilic/hydrophobic molecule, and a value of 20 corresponds to a completely hydrophilic/lipophobic molecule.

Griffin HLB values for a variety of non-ionic surfactants (some given as Trade Names) are tabulated in Table A. The non-ionic surfactants of this invention have HLB values that are greater than or equal to 12.

TABLE A

| Non-ionic Surfactant | Griffin HLB |
| --- | --- |
| Tween ® 20 | 16.7 |
| Brij ® 98 | 15.3 |
| Lubrol ® 17A17 | 15.1 |
| Tween ® 80 | 15 |
| Agnique ® F0H9 OC-20 B | 14.6 |
| Plurafac ® LF 221 | 13.9 |
| Octyl phenol 10E | 13.4 |
| C8-10 APG | 13.2 |
| Brij ® 96 | 12.2 |
| Synperonic ® A7 | 12.1 |
| Tween ® 85 | 11 |
| C12-14 E4 | 9.4 |
| Span ® 20 | 8.6 |
| Brij ® 92 | 4.9 |
| Glyceryl monooleate | 4.2 |
| Glyceryl monostearate | 3.8 |
| Coco monoethanolamide | 3.5 |
| Pentanol | 3.1 |

The present invention provides a composition comprising
(i) an alkyl polyglucoside of formula (I)

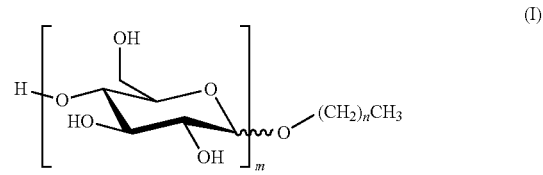

where n is a mean value and is from 7 to 11; and m is a mean value and is from 1 to 3;
(ii) a non-ionic surfactant which is not an alkyl polyglucoside and which has a Griffin HLB greater than or equal to 12; and
(iii) an agrochemical, or a salt of an agrochemical, which has a water solubility of less than 300 g/l at 25° C.;

where the concentration by weight of component (i) is greater than or equal to the concentration by weight of component (ii).

Preferably the Griffin HLB of the non-ionic surfactant is greater than or equal to 12.5; more preferably it is from 13 to 17; even more preferably it is from 13.5 to16; and most preferably it is from 13.5 to 15.

Preferably the Griffin HLB of the alkyl polyglucoside is greater than or equal to 12; more preferably it is from 13 to 17; even more preferably it is from 13.5 to16; and most preferably it is from 13.5 to 15.

Preferred non-ionic surfactants are selected from Agnique® FOH9 OC-20B (also referred to as Agnique® 20B or Ag 20B), Plurafac® LF 221 and Synperonic® A7 and their chemical equivalents. The surfactants are defined according to their CAS numbers which are respectively:

CAS 146340-16-1 Alcohols, C12-18, ethers with polyethylene glycol mono-Butyl ether;
CAS 111905-53-4 Alcohols, C13-15-branched and linear, butoxylated, ethoxylated; and
CAS 68131-39-5 Fatty Alcohol ethoxylate.

Agnique® 20B is a butyl ether of a fatty alcohol ethoxylate with an average of 20 moles of ethoxylate. Plurafac® LF 221 is a butylene oxide/ethylene oxide copolymer of a C13-C15 alcohol. Synperonic® A7 is a fatty alcohol ethoxylate with an average of seven moles of ethoxylate.

Suitable APG commercial products, according to formula (I) are provided in Table B:

TABLE B

| APG | Tail carbon atoms | Mean number of Sugar rings (m) | Griffin HLB |
|---|---|---|---|
| Agnique ® PG8105 | from 8 to 10 | 1.5 | 13.2 |
| Agnique ® PG8107 | from 8 to 10 | 1.7 | 13.6 |
| Agnique ® PG9116 | from 9 to 11 | 1.6 | 13.1 |
| Agnique ® PG8166 | from 8 to 16 | 1.6 | 12.8 |
| Agnique ® PG266 | from 12 to 16 | 1.6 | 12.8 | n+1 is the mean number of carbon atoms in the hydrophobic tail of the surfactant.

Preferably n is from 7 to 15; more preferably n is from 7 to 13; and even more preferably it is from 7 to 11.

m is the mean number of sugar rings on the hydrophilic head group of the APG.

Preferably m is from 1 to 3; more preferably m is from 1 to 2; most preferably m is from 1.4 to 1.8.

The adjuvant composition of this invention is designed to improve the biological efficacy of an agrochemical, or salt of an agrochemical, which has a water solubility less than 300 g/l at 25° C.

The noun "agrochemical" and term "agrochemically active ingredient" are used herein interchangeably, and include herbicides, insecticides, nematicides, molluscicides, fungicides, plant growth regulators and safeners; preferably herbicides, insecticides and fungicides; more preferably fungicides and herbicides; and most preferably fungicides.

Provided an agrochemical, or a salt of the agrochemical, selected form those given below, has a water solubility of less than 300 g/l (preferably less than 200 g/l; more preferably less than 100 g/l; even more preferably less than 50 g/l; and most preferably less than 5 g/l) at 25° C., then it is suitable for the present invention.

Suitable herbicides include pinoxaden, bicyclopyrone, mesotrione, fomesafen, tralkoxydim, napropamide, amitraz, propanil, pyrimethanil, dicloran, tecnazene, toclofos methyl, flamprop M, 2,4-D, MCPA, mecoprop, clodinafop-propargyl, cyhalofop-butyl, diclofop methyl, haloxyfop, quizalofop-P, indol-3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluoroglycofen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, iodosulfuron, mesosulfuron, diflufenican, flufenacet, fluroxypyr, aminopyralid, pyroxsulam, XDE-848 Rinskor and halauxifen-methyl.

Suitable fungicides include isopyrazam, mandipropamid, azoxystrobin, trifloxystrobin, kresoxim methyl, famoxadone, metominostrobin and picoxystrobin, cyprodanil, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, thiram, ziram, captafol, captan, folpet, fluazinam, flutolanil, carboxin, metalaxyl, bupirimate, ethirimol, dimoxystrobin, fluoxastrobin, orysastrobin, metominostrobin, prothioconazole, adepidyn, bixafen, fluxapyroxad, prothioconazole, pyraclostrobin, revysol, solatenol and xemium.

Suitable insecticides include thiamethoxam, imidacloprid, acetamiprid, clothianidin, dinotefuran, nitenpyram, fipronil, abamectin, emamectin, bendiocarb, carbaryl, fenoxycarb, isoprocarb, pirimicarb, propoxur, xylylcarb, asulam, chlorpropham, endosulfan, heptachlor, tebufenozide, bensultap, diethofencarb, pirimiphos methyl, aldicarb, methomyl, cyprmethrin, bioallethrin, deltamethrin, lambda cyhalothrin, cyhalothrin, cyfluthrin, fenvalerate, imiprothrin, permethrin, halfenprox, oxamyl, flupyradifurone, sedaxane, inscalis, rynaxypyr, sulfoxaflor and spinetoram.

Suitable plant growth regulators include paclobutrazole and 1-methylcyclopropene.

Suitable safeners include benoxacor, cloquintocet-mexyl, cyometrinil, dichlormid, fenchlorazole-ethyl, fenclorim, flurazole, fluxofenim, mefenpyr-diethyl, MG-191, naphthalic anhydride and oxabetrinil.

Suitably, the agrochemical is selected from bicyclopyrone, mesotrione, pinoxaden, fomesafen,tralkoxydim, napropamide, amitraz, propanil, pyrimethanil, dicloran, tecnazene, toclofos methyl, flamprop M, 2,4-D, MCPA, mecoprop, clodinafop-propargyl, cyhalofop-butyl, diclofop methyl, haloxyfop, quizalofop-P, indol-3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluoroglycofen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, isopyrazam, mandipropamid, azoxystrobin, trifloxystrobin, kresoxim methyl, famoxadone, metominostrobin and picoxystrobin, cyprodanil, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, thiram, ziram, captafol, captan, folpet, fluazinam, flutolanil, carboxin, metalaxyl, bupirimate, ethirimol, dimoxystrobin, fluoxastrobin, orysastrobin, metominostrobin, prothioconazole, thiamethoxam, imidacloprid, acetamiprid, clothianidin, dinotefuran, nitenpyram, fipronil, abamectin, emamectin, bendiocarb, carbaryl, fenoxycarb, isoprocarb, pirimicarb, propoxur, xylylcarb, asulam, chlorpropham, endosulfan, heptachlor, tebufenozide, bensultap, diethofencarb, pirimiphos methyl, aldicarb, methomyl, cyprmethrin, bioallethrin, deltamethrin, lambda cyhalothrin, cyhalothrin, cyfluthrin, fenvalerate, imiprothrin, permethrin, halfenprox, paclobutrazole, 1-methylcyclopropene, benoxacor, cloquintocet-mexyl, cyometrinil, dichlormid, fenchlorazole-ethyl, fenclorim, flurazole, fluxofenim, mefenpyrdiethyl, MG-191, naphthalic anhydride and oxabetrinil.

Preferred agrochemical active ingredients are isopyrazam, epoxiconazole, fomesafen, mesotrione, pinoxaden, abamectin, nicosulfuron and azoxystrobin.

More preferably, the agrochemical is selected from isopyrazam, epoxiconazole, fomesafen, mesotrione, pinoxaden and nicosulfuron. Even more preferably, the agrochemical is isopyrazam or epoxiconazole.

The various editions of The Pesticide Manual [especially the 14th and 15th editions] also disclose details of agrochemicals, any one of which may suitably be used in the present invention.

Suitably, compositions of the invention may comprise one or more of the agrochemicals described above.

Generally any agrochemically active ingredient will be present at a concentration of from about 0.000001% to about 90% w/w; preferably from about 0.001% to about 90% w/w. Agrochemical compositions of the invention may be in the form of a ready-to-use formulation or in concentrate form suitable for further dilution by the end user, and the concentration of agrochemical, non-ionic surfactant and compound of formula (I) will be adjusted accordingly. In concentrated form, compositions of the invention typically contain an agrochemical at from 5 to 90% w/w, more preferably from 5 to 75% w/w, even more preferably from 10 to 50% w/w, of the total composition. Ready-to-use compositions of the invention will typically contain an agrochemical at from 0.000001% to 1% w/w, more preferably from 0.000001% to 0.5% w/w, and more preferably still from 0.001% to 0.1% w/w, of the total composition.

Suitably a composition of the present invention has a weight ratio of component (i) to component (ii) from 1:1 to 10:1; more suitably from 2:1 to 5:1; even more suitably from 2.5:1 to 3.5:1; and most suitably 3:1.

The compositions of the present invention may relate to concentrates designed to be added to a farmer's spray tank of water or they may be applied directly without further dilution.

The present invention also relates to a composition in a farmer's spray tank; it includes a composition as described above which further comprises water and the total concentration of components (i) and (ii) in the water is at least 0.05% by volume.

Preferably compositions are selected from an SC (suspension concentrate); an SL (soluble liquid); an EC (emulsifiable concentrate); a DC (dispersible concentrate); and an OD (oil dispersion).

Furthermore, an adjuvant system as herein described may be designed to be added to a formulation of an agrochemical (for example by mixing with water in a farmer's spray tank).

Therefore in a further aspect, the present invention relates to the use of a composition, which is preferably an SL (soluble liquid), to improve the biological performance of an agrochemical, or a salt of an agrochemical, which has a water solubility of less than 300 g/l at 25° C.; where the composition comprises:
(i) an alkyl polyglucoside of formula (I) where n is a mean value and is from 7 to 11; and m is a mean value and is from 1 to 3; and
(ii) a non-ionic surfactant which is not an alkyl polyglucoside and which has a Griffin HLB greater than or equal to 12; where the concentration by weight of component (i) is greater than or equal to the concentration by weight of component (ii).

The compositions of the present invention may include other ingredients such as an anti-foam agent, an anti-bacterial agent, colourant, perfume etc.

The following examples demonstrate the biological performance of APG mixtures of adjuvants. Throughout the examples, the amount of adjuvant used refers to the adjuvant itself (rather than the product in which it is contained, since the product might not be 100% adjuvant) and the ratios of adjuvants are ratios by weight.

EXAMPLE 1

This example shows that a mixture of three parts of an APG with 1 part of a standard high quality adjuvant was as effective against the fungus *Septoria tritici* as a formulation containing an equivalent weight of just the standard adjuvant. Wheat plants were sprayed with water (actually a 12.5% v/v isopropanol in water mixture to avoid retention problems on the leaf surface) at a rate of 200 litres per hectare, the water containing isopyrazam, at a concentration which achieved an isopyrazam application rate of 0.6, 2, 6 or 20 grams per hectare. The isopyrazam was supplied as a suspension concentrate formulation. Each adjuvant system tested was added at a rate of 0.1% by volume (v/v) of the total spray mixture. As comparisons to the with-adjuvant applications, the izopyrazam suspension concentrate formulation was also tested without an adjuvant; and in addition a blank formulation without agrochemical or adjuvant was tested (this meant that the blank formulation was merely an isopropanol/water mixture; the blank had the same amount of isopropanol as the other formulations tested in this example). Each experiment was replicated 12 times. The wheat plants were inoculated four days before being sprayed; 14 days after spraying, the percentage disease (infection) on each wheat plant was assessed visually.

The infection results were analyzed using Tukeys HSD test (which compares mean results) and a letter was assigned to each experiment; experiments with different letters produced results which were statistically different to each other.

In this test the commercial adjuvant Aqnique® PG8107 (see Table B) was used as the APG and the adjuvant Agnique® FOH9 OC-20B was used as the standard adjuvant; the adjuvant system was either Aqnique® PG8107 alone (at 0.1% v/v); Agnique® FOH9 OC-20B alone (at 0.1% v/v); or a 3 to 1 ratio by weight of the APG of Aqnique® PG8107 to the non-ionic surfactant of Agnique® FOH9 OC-20B (Ag 20B) (at a total of 0.1% v/v).

Table 1 shows the mean percentage *Septoria tritici* control for the adjuvants used across the four concentrations of isopyrazam as well as the standard experiment without adjuvant and the blank (isopropanol/water) test; where low levels of infection mean good control. It can be seen that the APG adjuvant was not as good as either the '3 APG to 1 Standard' adjuvant system or the standard adjuvant.

TABLE 1

| Adjuvant System | Mean % infection | Letter | Performance c.f. Agnique ® 20B alone |
|---|---|---|---|
| APG | 83.3 | A | Worse |
| Blank | 71.5 | A | Worse |
| No adjuvant | 68.4 | A | Worse |
| Standard adjuvant | 45.9 | BC | Equal |
| 3 APG to 1 Standard | 37.3 | CD | Equal |

EXAMPLE 2

Like Example 1, this example shows that a mixture of three parts by weight of an APG with 1 part of a standard high quality adjuvant was as effective against the fungus *Septoria tritici* as a formulation containing an equivalent weight of just the standard adjuvant; the difference being that instead of isopyrazam, the fungicide used was epoxiconazole. The epoxiconazole was supplied as a suspension concentrate formulation.

Table 2 shows the mean percentage *Septoria tritici* control for the adjuvants used across the four concentrations of epoxiconazole as well as the standard experiment without adjuvant and the blank (isopropanol/water) test; where low levels of infection mean good control. It can be seen that the '3 APG to 1 Standard' formulation was as good as the standard adjuvant formulation.

TABLE 2

| Adjuvant System | Mean % infection | Letter | Performance c.f. Agnique ® 20B alone |
|---|---|---|---|
| Blank | 72.7 | A | Worse |
| No adjuvant | 41.2 | B | Worse |
| APG | 28.8 | BC | Worse |
| 3 APG to 1 Standard | 18.1 | CD | Equal |
| Standard | 11.4 | D | Equal |

EXAMPLE 3

This Example is identical in approach to Example 1. In this test the commercial adjuvant Aqnique® PG8107 was used as the APG and the adjuvants Agnique® FOH9 OC-20B, Tween® 20, Synperonic® A7 and Plurafac® LF221 were used as examples of highly effective adjuvants.

Table 3 shows the mean percentage *Septoria tritici* control for the adjuvants used, averaged across the four levels of isopyrazam, as well as a standard formulation without adjuvant and a blank formulation. It can be seen that the APG adjuvant alone was not as good as Ag 20B alone nor the 3 to 1 APG blends with Agnique® 20B, Synperonic® A7 or Plurafac® LF221. All of the APG blends except that with Tween® 20 were as good as Agnique® 20B alone.

TABLE 3

| Adjuvant System | Mean % infection | Letter |
|---|---|---|
| No adjuvant | 75.5 | A |
| Blank | 63.9 | AB |
| APG | 58.0 | B |
| 3:1 APG:Tween ® 20 | 55.7 | B |
| 3:1 APG:Synperonic ® A7 | 31.7 | C |
| 3:1 APG:Agnique ® 20B | 31.5 | C |
| 3:1 APG:Plurafac ® LF221 | 30.7 | C |
| Agnique ® 20B | 26.5 | C |

EXAMPLE 4

This Example is identical in approach to Example 2. In this test the commercial adjuvant Aqnique® PG8107 was used as the APG and the adjuvants Agnique® FOH9 OC-20B, Tween® 20, Synperonic® A7 and Plurafac® LF221 were used as examples of highly effective adjuvants.

Table 4 shows the mean percentage *Septoria tritici* control for the adjuvants used, averaged across the four levels of epoxiconazole, as well as a standard formulation without adjuvant and a blank formulation. It can be seen that all the APG mixture systems were as good as the Agnique® 20B adjuvant.

TABLE 4

| Adjuvant System | Mean % infection | Letter |
|---|---|---|
| Blank | 62.0 | A |
| No adjuvant | 57.7 | A |
| APG | 35.9 | B |
| 3:1 APG:Tween ® 20 | 27.2 | BC |
| 3:1 APG:Synperonic ® A7 | 25.7 | BC |
| 3:1 APG:Plurafac ® LF221 | 25.1 | BC |
| Agnique ® 20B | 19.5 | C |
| 3:1 APG:Agnique ® 20B | 19.1 | C |

EXAMPLE 5

Individual plants of soyabean, bean or Chinese cabbage were sprayed with aqueous solutions of various adjuvant systems, at a total spray rate of 200 l/ha. The concentration of adjuvant in the spray water was either 0.1, 0.2 or 0.5% by volume. Visual damage to the plants was recorded 7 days after application as percentages of the surface showing phytotoxicity. Four adjuvants were tested, these were Agnique® 20 B; Agnique® PG8108; a blend of 1:1 by weight of the two adjuvants of those products; and a blend of 1:3 by weight of the non-ionic of Agnique® 20 B to the APG of Agnique® PG8108. Table 5 shows the resulting phytotoxicity scores; spray solutions with higher loadings of APG were less phytotoxic than those with equivalent levels of Agnique® 20B. All experiments were carried out twice and averaged.

TABLE 5

| | Phytotoxicity assessments. | | | | |
|---|---|---|---|---|---|
| Plant | Rate % v/v | Agnique ® 20B (alone) | Ag 20B: APG 1:1 | Ag 20B: APG 1:3 | APG (alone) |
| Soybean | 0.50% | 15 | 20 | 10 | 2 |
| | 0.20% | 10 | 10 | 5 | 1 |

TABLE 5-continued

Phytotoxicity assessments.

| Plant | Rate % v/v | Agnique ® 20B (alone) | Ag 20B: APG 1:1 | Ag 20B: APG 1:3 | APG (alone) |
|---|---|---|---|---|---|
| Bean | 0.10% | 2 | 2 | 1 | 0 |
|  | 0.50% | 10 | 5 | 2 | 0 |
|  | 0.20% | 5 | 0 | 0 | 0 |
|  | 0.10% | 0 | 0 | 0 | 0 |
| Chinese cabbage | 0.50% | 20 | 20 | 2 | 0 |
|  | 0.20% | 10 | 5 | 1 | 0 |
|  | 0.10% | 5 | 2 | 0 | 0 |

EXAMPLE 6

Adjuvants were tested in a glasshouse against four weed species in combination with the herbicide nicosulfuron. An agrochemical composition was prepared containing 0.2% v/v of the adjuvant in a track sprayer and was applied at a volume of 200 litres per hectare. Nicosulfuron was applied at either 30 or 60 grams of pesticide per hectare on weeds which had been grown in a glasshouse. The weed species were *Chenopodium album* (CHEAL) BBCH leaf stage 1.4-1.5, *Abutilon theophrasti* (ABUTH) BBCH leaf stage 1.3, *Setaria viridis* (SETVI) BBCH leaf stage 1.3-1.4, and *Digitaria sanguinalis* (DIGSA) BBCH leaf stage 1.4.

Each spray test was replicated three times. The efficacy of the herbicide was assessed visually and expressed as a percentage of the leaf area killed. Samples were assessed at time periods of 14 and 21 days following application. The results shown in Table 6 below are mean averages over the two rates of nicosulfuron, three replicates and the two assessment timings. The results of a mixture of the alkyl polyglucoside (Agnique® PG 8107) with a commercially available adjuvant Agnique OC 20B® (BASF SE), are compared to the two components tested singly, as well as an adjuvant free formulation, and also another commercially available adjuvant for nicosulfuron, Atplus 411F® (Clariant GmbH), tested at the recommended level of 0.5% by volume.

A letter has been ascribed to each result according to Tukey's HSD test. Samples with the same letter provide the same statistical level of performance. It can be seen that in all cases the mixture of two surfactants was as good as Agnique FOH9 OC-20B or Atplus 411F. The alkyl polyglucoside alone was not as good on any weed species as Agnique FOH9 OC-20B.

TABLE 6

| Adjuvant | SETVI | CHEAL | ABUTH | DIGSA |
|---|---|---|---|---|
| Atplus ® 411F | 91.8 A | 78.3 AB | 60.0 AB | 84.2 A |
| Agnique ® FOH 9 OC-20B | 92.2 A | 80.0 A | 65.0 A | 82.5 A |
| Agnique ® 20B/APG 1:3 | 91.8 A | 76.7 AB | 56.7 AB | 82.9 A |
| Agnique ® PG 8107 | 79.6 C | 68.3 B | 54.6 B | 47.1 B |
| No Adjuvant | 86.3 B | 38.3 C | 62.1 AB | 6.7 C |

EXAMPLE 7

Adjuvants were tested in a glasshouse against four weed species in combination with the herbicide fomesafen. An agrochemical composition was prepared containing 0.2% v/v of the adjuvant in a track sprayer and was applied at a volume of 200 litres per hectare. Fomesafen was applied at either 100 or 200 grams of pesticide per hectare. The weed species were *Chenopodium album* (CHEAL) BBCH leaf stage 1.6, *Abutilon theophrasti* (ABUTH) BBCH leaf stage 1.3, *Setaria viridis* (SETVI) BBCH leaf stage 1.4, and *Ipomea hederacea* (IPOHE) BBCH leaf stage 1.2.

Each spray test was replicated three times. The efficacy of the herbicide was assessed visually and expressed as a percentage of the leaf area killed. Samples were assessed at time periods of 14 and 21 days following application. The results shown in Table 7 below are mean averages over the two rates of fomesafen, three replicates and the two assessment timings.

The results of a mixture of the alkyl polyglucoside (Agnique® PG 8107) with a commercially available adjuvant Agnique OC 20B® (BASF SE), are compared to the two components tested singly, as well as an adjvant free formulation, and also another commercially available adjuvant for fomesafen, Turbocharge® D (Syngenta crop protection Canada Ltd), tested at the recommended level of 0.5% by volume.

A letter has been ascribed to each result according to Tukey's HSD test. Samples with the same letter provide the same statistical level of performance. It can be seen that in all cases the mixture of two surfactants was as good as Agnique FOH9 OC-20B. The alkyl polyglucoside alone was not as good as either of the standard adjuvants on CHEAL, or as good as Turbocharge D on ABUTH.

TABLE 7

| Adjuvant | SETVI | CHEAL | ABUTH | IPOHE |
|---|---|---|---|---|
| Turbocharge ® D | 63.0 A | 74.8 A | 78.5 A | 90.8 A |
| Agnique ® FOH 9 OC-20B | 72.4 A | 71.7 AB | 66.5 B | 97.7 A |
| Agnique ® 20B/APG 1:3 | 57.2 A | 60.5 BC | 69.0 AB | 96.4 A |
| Agnique ® PG 8107 | 49.7 A | 57.5 C | 59.0 B | 89.2 A |
| No Adjuvant | 52.1 A | 39.1 D | 69.5 AB | 54.1 B |

EXAMPLE 8

Adjuvants were tested in a glasshouse against three weed species in combination with the herbicide mesotrione. An agrochemical composition was prepared containing 0.2% v/v of the adjuvant in a track sprayer and was applied at a volume of 200 litres per hectare. Mesotrione was applied at either 60 or 120 grams of pesticide per hectare on weeds which had been grown to the 1.3 or 1.4 leaf stage. The weed species were *Polygonum convolvulus* (POLCO) BBCH growth stage 1.4, *Brachiaria platyphylla* (BRAPP) BBCH growth stage 1.4, and *Digitaria sanguinalis* (DIGSA) BBCH growth stage 1.4.

Each spray test was replicated three times. The efficacy of the herbicide was assessed visually and expressed as a percentage of the leaf area killed. Samples were assessed at time periods of 14 and 21 days following application. The results shown in Table 8 below are mean averages over the two rates of mesotrione, three replicates and the two assessment timings.

The results of a mixture of the alkyl polyglucoside (Agnique® PG 8107) with a commercially available adjuvant Agnique FOH 9 OC 20B® (BASF SE), are compared to the two components tested singly, as well as an adjvant free formulation, and also another commercially available adjuvant for mesotrione, Tween 20® (Croda Europe Limited), tested at the recommended level of 0.5% by volume.

A letter has been ascribed to each result according to Tukey's HSD test. Samples with the same letter provide the same statistical level of performance. It can be seen that in all cases the adjuvants performed better than the sample without an adjuvant. The mixture of alkylpolyglucoside was as good as the single adjuvant samples. While in this test it has not been shown that the alkyl polyglucoside mixture is statistically better than the single APG adjuvant, it has been shown to be numerically better, and statistically just as good.

TABLE 8

| Adjuvant | BRAPP | DIGSA | POLCO |
| --- | --- | --- | --- |
| Tween ® 20 | 54.2 A | 82.1 A | 83.2 AB |
| Agnique ® FOH 9 OC-20B | 62.9 A | 74.6 A | 86.3 A |
| Agnique ® 20B/APG 1:3 | 57.5 A | 77.5 A | 87.8 A |
| Agnique ® PG 8107 | 54.6 A | 73.8 A | 87.7 A |
| No Adjuvant | 33.8 B | 37.1 B | 74.8 B |

EXAMPLE 9

Adjuvants were tested in a glasshouse against four weed species in combination with the herbicide pinoxaden. An agrochemical composition was prepared containing 0.2% v/v of the adjuvant in a track sprayer and was applied at a volume of 200 litres per hectare.

Pinoxaden was applied at either 7.5 or 15 grams of pesticide per hectare on each of the weed species. The weed species and their growth stage at spraying were *Alopecurus myosuroides* (ALOMY; BBHC growth stage 1.3), *Avena fatua* (AVEFA; BBHC growth stage 1.2); *Lolium perenne* (LOLPE; BBHC growth stage 1.3), *Setaria viridis* (SETVI; BBHC growth stage 1.3-1.4).

Each spray test was replicated three times. The efficacy of the herbicide was assessed visually and expressed as a percentage of the leaf area killed. Samples were assessed at time periods of 14 and 21 days following application. The results shown in Table 9 below are mean averages over the two rates of pinoxaden, three replicates and the two assessment timings.

The results of a mixture of the alkyl polyglucoside (Agnique® PG 8107) with a commercially available adjuvant Agnique OC 20B® (BASF SE), are compared to the two components tested singly, as well as an adjvant free formulation, and also another commercially available adjuvant for pinoxaden, Synergen TEHP® (Clariant GmbH), tested at the recommended level of 0.5% by volume.

A letter has been ascribed to each result according to Tukey's HSD test. Samples with the same letter provide the same statistical level of performance. It can be seen that in all cases the mixture of two surfactants was as good as Agnique FOH9 OC-20B. The alkyl polyglucoside alone was not as good on any weed species as Agnique FOH9 OC-20B, with the exception of ALOMY. In that case the mixture of APG with Agnique 20B was statistically better than the APG single adjuvant.

TABLE 9

| Adjuvant | AVEFA | LOLPE | SETVI | ALOMY |
| --- | --- | --- | --- | --- |
| TEHP | 85.0 A | 81.7 A | 91.4 A | 28.8 A |
| Agnique ® FOH 9 OC-20B | 77.9 B | 44.3 B | 89.8 A | 12.0 BC |
| Agnique ® 20B/APG 1:3 | 76.3 B | 38.1 B | 88.0 A | 15.8 B |
| Agnique ® PG 8107 | 8.6 C | 3.8 C | 39.5 B | 4.1 C |
| No Adjuvant | 5.6 C | 2.4 C | 7.3 C | 4.0 C |

The invention claimed is:

1. A composition, which is a suspension concentrate, comprising:
   (i) an alkyl polyglucoside of formula (I)

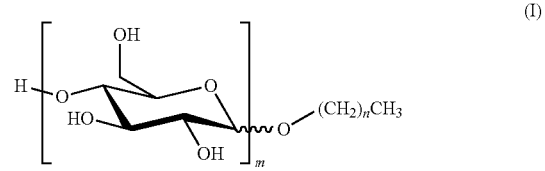

where n is a mean value and is from 7 to 11; and
m is a mean value and is from 1 to 3;
   (ii) a non-ionic surfactant which is not an alkyl polyglucoside and which has a Griffin HLB of from 13.5 to 16; and
   (iii) an agrochemical, or a salt of an agrochemical, which has a water solubility of less than 300 g/l at 25° C.;
where the concentration by weight of component (i) is greater than or equal to the concentration by weight of component (ii).

2. The composition of claim 1, where the agrochemical is selected from the group consisting of isopyrazam, epoxiconazole, fomesafen, mesotrione, pinoxaden, abamectin, nicosulfuron or azoxystrobin.

3. The composition of claim 1, where the weight ratio of component (i) to component (ii) is from 1:1 to 10:1.

4. The composition of claim 1, where the composition further comprises water and the total concentration of components (i) and (ii) in the water is at least 0.05% by volume.

5. The composition of claim 4, where the weight ratio of component (i) to component (ii) is from 1:1 to 10:1.

6. The composition of claim 3, where m is 1.4 to 1.8.

7. The composition of claim 3, where the water solubility of the agrochemical of less than 5 g/l at 25° C.

8. The composition of claim 3, where the weight ratio of component (i) to component (ii) is from 2.5:1 to 3.5:1.

9. The composition of claim 1, where the non-ionic surfactant is a butylene oxide/ethylene oxide copolymer of a C13-C15 alcohol.

10. The composition of claim 1, where the non-ionic surfactant is a butyl ether of a fatty alcohol ethoxylate with an average of 20 moles of ethoxylate.

* * * * *